United States Patent

[11] 3,629,631

| [72] | Inventors | Herbert John Thomas Cotton<br>"Lea Mount" 195 Alcester Road,<br>Hollywood, Worcestershire;<br>Robert Hemmings, 49 Masters Lane,<br>Halesowen, Worcestershire, both of<br>England |
|------|-----------|---|
| [21] | Appl. No. | 30,563 |
| [22] | Filed | Apr. 21, 1970 |
| [45] | Patented | Dec. 21, 1971 |
| [32] | Priority | June 9, 1969 |
| [33] | | Great Britain |
| [31] | | 29,033/69 |

[54] FULL WAVE RECTIFIER ASSEMBLIES
5 Claims, 3 Drawing Figs.

[52] U.S. Cl. .................................................. 310/68 D,
321/8 C
[51] Int. Cl. ....................................................... H02k 11/00
[50] Field of Search ........................................... 310/68, 68
D, 66, 112, 159, 171, 254; 290/38

[56] References Cited
UNITED STATES PATENTS

| 2,497,141 | 2/1950 | Schultz | 310/112 |
| 3,078,409 | 2/1963 | Bertsche | 310/68 D |
| 3,476,950 | 11/1969 | Carlson | 290/38 |
| 3,538,362 | 11/1970 | Cheetham | 310/68 |

FOREIGN PATENTS

| 1,113,428 | 5/1968 | Great Britain | 310/68 |
| 6,603,843 | 10/1966 | Netherlands | 310/68 |

*Primary Examiner*—J. D. Miller
*Assistant Examiner*—R. Skudy
*Attorney*—Holman, Glascock, Downing & Seebold ABSTRACT: A full wave rectifier assembly includes a first plate carrying first, second, and third semiconductor diodes with their terminals of one polarity electrically connected to the first plate, and a second plate positioned parallel to the first plate and in heat exchange relationship therewith. The second plate is spaced from the first plate by a thin layer of insulating material, and the other terminals of the first, second and third diodes of opposite polarity to the one polarity extend through holes in the second plate. Fourth, fifth and sixth semiconductor diodes are carried by the second plate with their terminals of the opposite polarity electrically connected to the second plate. The assembly further includes first, second, and third phase connectors, the first phase connector being connected to the other terminals of the first and fourth diodes, the second phase connector being connected to the other terminals of the second and fifth diodes and the third phase connector being connected to the other terminals of the third and sixth diodes, so that in use when the phases of a three-phase AC supply are connected to the phase connectors respectively DC will flow in a load connected across the first and second plates.

INVENTOR
Herbert John Thomas Cotton & Robert Hemmings
Holman, Glascock, Downing & Seebold
ATTORNEYS

FULL WAVE RECTIFIER ASSEMBLIES

This invention relates to full wave rectifier assemblies for rectifying AC supplies having at least three phases.

An assembly according to the invention includes a first plate carrying first, second, and third semiconductor diodes with their terminals of one polarity electrically connected to the first plate, a second plate positioned parallel to the first plate and in heat exchange relationship therewith, the second plate being spaced from the first plate by a thin layer of insulating material, and the other terminals of said first, second and third diodes of opposite polarity to said one polarity extending through holes in said second plate, fourth, fifth and sixth semiconductor diodes carried by the second plate with their terminals of said opposite polarity electrically connected to the second plate, and first, second, and third phase connectors, the first phase connector being connected to the other terminals of the first and fourth diodes, the second phase connector being connected to the other terminals of the second and fifth diodes and the third phase connector being connected to the other terminals of the third and sixth diodes, so that in use when the phases of a three-phase AC supply are connected to the phase connectors respectively DC will flow in a load connected across the first and second plates.

One example of the invention is illustrated in the accompanying drawings, wherein, FIG. 1 is an end view of an alternator with the end cover removed.

Figure 1:
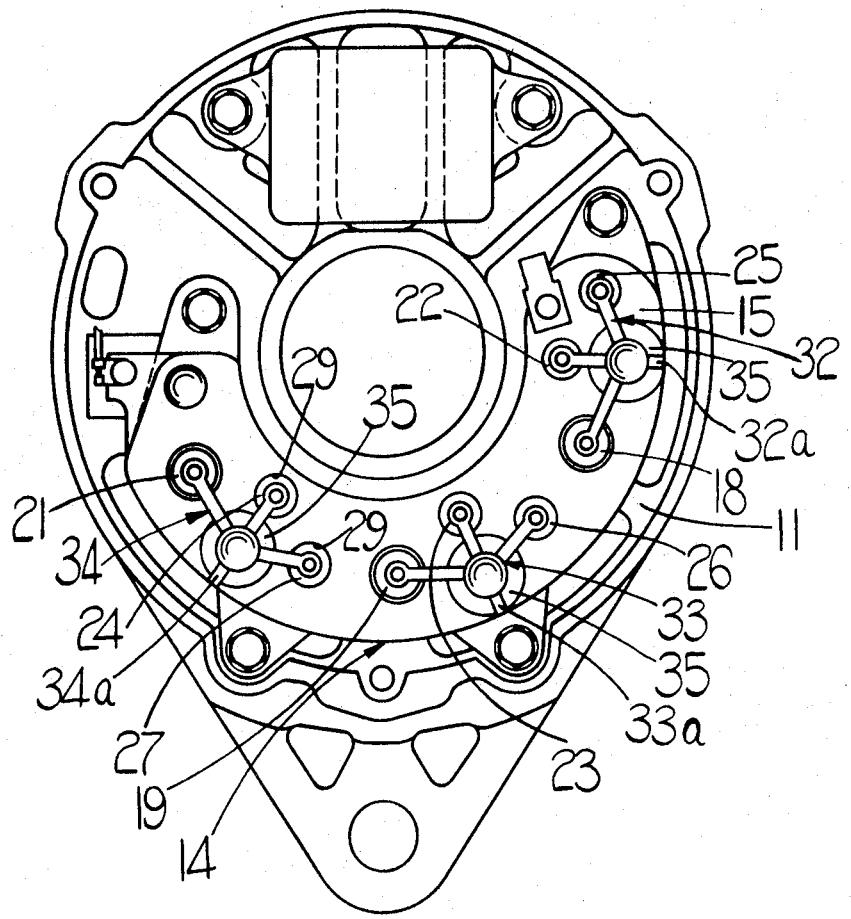
Figure 2:
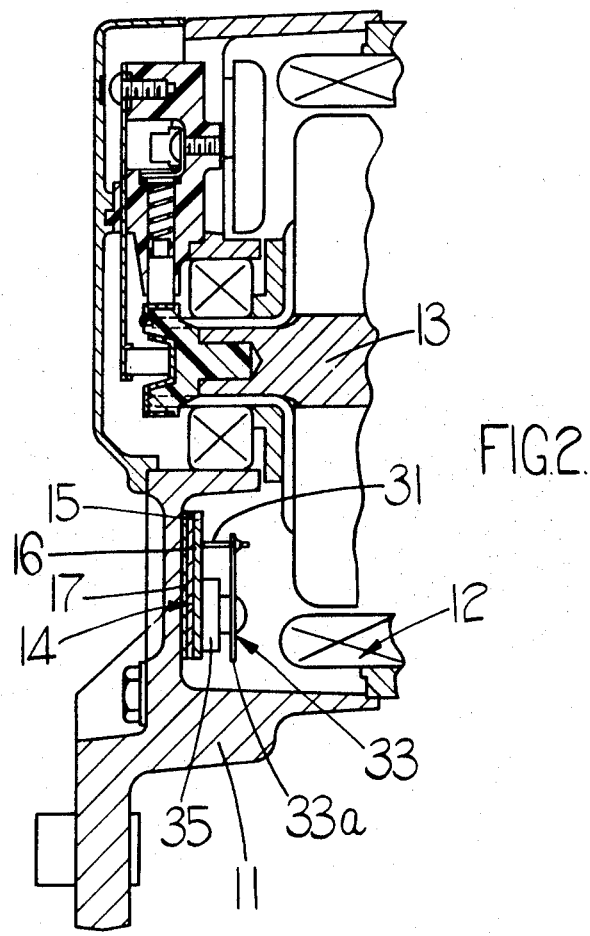
FIG. 2 is a sectional view of part of the alternator shown in FIG. 1.

Referring to the drawings, the alternator includes a metal frame 11 carrying a stator assembly 12 and having a rotor assembly including a rotor shaft 13 journaled for rotation therein. The rotor assembly includes a field winding, and is rotatable within the confines of the stator assembly 12, the stator assembly including delta connected phase windings. Secured to the frame 11 is a full wave rectifier assembly 14 which includes a first set of diodes with their anodes interconnected and their cathodes connected to the phase points of the stator windings respectively, a second set of diodes with their cathodes interconnected and their anodes connected to the phase points of the stator winding respectively, the first and second sets of diodes constituting a full wave rectifier, and a third set of diodes with their cathodes interconnected and their anodes connected to the phase points of the stator winding respectively, the third set of diodes providing an input to a voltage regulator controlling the alternator output, and in so doing serving to extinguish an ignition warning lamp.

Figure 3:
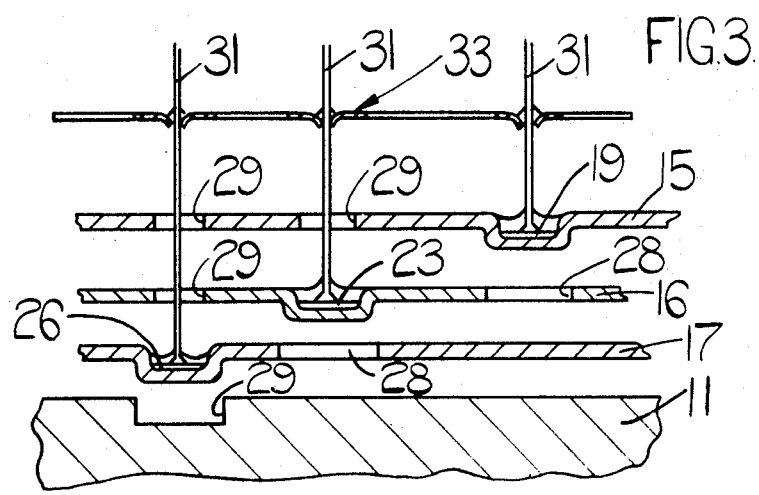
FIG. 3 is an exploded, diagrammatic view of part of the full wave rectifier assembly of the alternator shown in FIG. 1.

The full wave rectifier assembly 14 includes three arcuate terminals plates 15, 16, 17 which are mounted in face-to-face relationship on the frame 11 to define a rectifier pack. The first set of diodes 18, 19, 21 are mounted in recesses in the plate 15 with their anodes connected to the plate 15, the second set of diodes 22, 23, 24 are mounted in recesses in the plate 16 with their cathodes electrically connected to the plate 16, and the third set of diodes 25, 26, 27 are mounted in recesses in the plate 17 with their anodes electrically connected to the plate 17. The surfaces of the plates 15, 16, 17 are coated with insulating material to insulate the plates 15, 16, 17 from one another, and from the frame 11, and the plates 15, 16, 17 are engaged in facial contact with one another and the frame 11 so as to be in heat exchange relationship with one another and the frame 11. The recesses in the plates 15, 16, 17 accommodating the diodes, result in projections on one surface of the plates 15, 16, 17, and in order to accommodate the projections the adjacent plates, and the frame 11 are formed with apertures (three of which are shown at 28 in FIG. 3). The diodes of each set of diodes are spaced from one another on their respective plates, and the arrangement is such that when the full wave rectifier pack is assembled, then the diodes 18, 22, 25, the diodes 19, 23, 26, and the diodes 21, 24, 27 are adjacent one another. The anode terminals of the diodes 15, 16, 17 and the diodes 25, 26, 27 together with the cathode terminals of the diodes 22, 23, 24 are defined by conductive leads 31 which extend at right angles to the plates 15, 16, 17, and the plates 15, 16 are formed with apertures 29 through which the leads 31 extend.

By virtue of the arrangement described above, the leads of the diodes 18, 22, 25 extend from the assembly 14 adjacent one another, the leads 31 from the diodes 19, 23, 26 and the leads from the diodes 21, 24, 27 similarly extending from the assembly 14 adjacent one another. Electrically connected to the leads 31 of the diodes 18, 22, 25, the leads 31 of the diodes 19, 23, 26 and the leads of the diodes 21, 24, 27, are respective phase connectors 32, 33, 34. The phase connectors 32, 33, 34 are each stamped from copper sheet, and include three arms extending from a central boss, the three arms of the connector 32 being electrically connected to the leads of the diodes 18, 22, 25 the three arms of the connector 33 being connected to the leads of the diodes 19, 23, 26, and the three arms of the connector 34 being connected to the leads of the diodes 21, 24, 27. The bosses of the connectors 32, 33, 34 are supported by respective insulating posts 35 mounted on the plate 15, and extending from each of the bosses is a phase terminal 32a, 33a, 34a respectively.

The terminal plates 15, 16, 17 carry respective connectors, and the phase terminals 32a, 33a, 34a of the rectifier assembly 14 are connected to the phase points of the delta connected stator winding of the alternator respectively. Thus, when the alternator is operating, a DC output appears across the plates 15, 16, and a further rectified signal appears at the plate 17, and is used to operate a warning lamp. The heat generated at the diodes of the assembly is conducted by the plates of the assembly to the frame 11, the frame 11 constituting the principle heat sink and heat radiator of the full wave rectifier assembly.

Having thus described our invention what we claim as new and desire to secure by Letters Patent is:

1. A full wave rectifier assembly including a first plate carrying first, second, and third semiconductor diodes with their terminals of one polarity electrically connected to the first plate, a second plate positioned parallel to the first plate and in heat exchange relationship therewith, the second plate being spaced from the first plate by a thin layer of insulating material, and the other terminals of said first, second and third diodes of opposite polarity to said one polarity extending through holes in said second plate, fourth, fifth and sixth semiconductor diodes carried by the second plate with their terminals of said opposite polarity electrically connected to the second plate, each of said first to sixth semiconductor diodes being mounted in a recess in one surface of its respective plate with the other surface of the plate being formed with complementary projections, and the second plate being formed adjacent the projections on the first plate with apertures to receive said projections respectively, and first, second and third phase connectors, the first phase connector being connected to the other terminals of the first and fourth diodes, the second phase connector being connected to the other terminals of the second and fifth diodes and the third phase connector being connected to the other terminals of the third and sixth diodes so that in use when the phases of a three-phase AC supply are connected to the phase connectors respectively DC will flow in a load connected across the first and second plates.

2. An assembly as claimed in claim 1 further including a third plate parallel to the first and second plates and in heat exchange relationship therewith, the third plate being spaced from the first plate by a thin layer of insulating material, seventh, eighth and ninth semiconductor diodes carried by the third plate with their terminals of said opposite polarity connected to the third plate and their other terminals of said one polarity extending through holes in the first and second plates respectively, said first, second and third phase connectors also being connected to the other terminals of said seventh, eighth and ninth diodes respectively, so that in use when the phases of the three-phase AC supply are connected to the phase connectors respectively a rectified signal will be produced at the third plate.

3. An assembly as claimed in claim 1 wherein the plates are mounted on a thermally conductive frame which comprises the principle heat sink and heat radiator of the assembly.

4. An assembly as claimed in claim 4 wherein said frame carriers the stator winding of an alternator.

5. An assembly as claimed in claim 2 wherein each of the seventh, eighth and ninth semiconductor diodes is mounted in a recess in one surface of the third plate with the other surface of the third plate being formed with complementary projections, and wherein the first plate is formed adjacent said projections on the third plate with apertures respectively to receive said projections.

* * * * *